US009462118B2

(12) United States Patent
Malueg et al.

(10) Patent No.: US 9,462,118 B2
(45) Date of Patent: Oct. 4, 2016

(54) VOIP COMMUNICATION CONTENT CONTROL

(75) Inventors: Michael D. Malueg, Renton, WA (US); Philip A. Chou, Bellevue, WA (US); Scott C. Forbes, Redmond, WA (US); Timothy M. Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1867 days.

(21) Appl. No.: 11/443,800

(22) Filed: May 30, 2006

(65) Prior Publication Data
US 2007/0280211 A1 Dec. 6, 2007

(51) Int. Cl.
| | |
|---|---|
| H04B 1/66 | (2006.01) |
| H04N 7/12 | (2006.01) |
| G10L 15/00 | (2013.01) |
| G10L 15/28 | (2013.01) |
| H04M 3/22 | (2006.01) |
| H04L 29/06 | (2006.01) |
| H04M 7/00 | (2006.01) |

(52) U.S. Cl.
CPC ............ H04M 3/2281 (2013.01); H04L 63/30 (2013.01); H04L 65/1026 (2013.01); H04L 65/605 (2013.01); H04L 63/20 (2013.01); H04M 7/0078 (2013.01); H04M 2201/18 (2013.01)

(58) Field of Classification Search
CPC ....... G10L 15/01; G10L 15/02; G10L 15/20; G10L 19/00
See application file for complete search history.

(56) References Cited

U.S. PATENT DOCUMENTS

| | | | |
|---|---|---|---|
| 5,602,962 A | 2/1997 | Kellermann | 704/226 |
| 6,463,413 B1 | 10/2002 | Applebaum et al. | 704/256.2 |
| 6,618,701 B2 | 9/2003 | Piket et al. | 704/233 |
| 6,633,536 B1 * | 10/2003 | Suvanen | 370/216 |
| 6,823,312 B2 | 11/2004 | Mittal et al. | 704/271 |
| 6,910,011 B1 | 6/2005 | Zakarauskas | 704/233 |
| 6,934,756 B2 * | 8/2005 | Maes | 709/227 |
| 7,373,297 B2 | 5/2008 | Habermas et al. | 704/233 |
| 7,519,536 B2 | 4/2009 | Maes et al. | 704/270.1 |
| 7,551,913 B1 * | 6/2009 | Chien | 455/411 |
| 7,720,681 B2 | 5/2010 | Milstein et al. | 704/244 |
| 2002/0036983 A1 * | 3/2002 | Widegren et al. | 370/230.1 |
| 2002/0138274 A1 * | 9/2002 | Sharma et al. | 704/270 |
| 2002/0184373 A1 * | 12/2002 | Maes | 709/228 |
| 2004/0002858 A1 | 1/2004 | Attias et al. | 704/226 |
| 2005/0015252 A1 | 1/2005 | Marumoto | 704/234 |
| 2005/0039027 A1 * | 2/2005 | Shapiro | 713/186 |
| 2005/0058144 A1 * | 3/2005 | Ayyagari et al. | 370/401 |
| 2005/0182626 A1 | 8/2005 | Kim et al. | 704/245 |
| 2005/0273839 A1 * | 12/2005 | Mikkonen | G06F 17/30867 725/135 |
| 2006/0013446 A1 * | 1/2006 | Stephens | G07C 9/00158 382/115 |
| 2006/0058999 A1 | 3/2006 | Barker et al. | 704/256 |
| 2006/0136203 A1 | 6/2006 | Ichikawa | 704/226 |
| 2008/0266377 A1 * | 10/2008 | Kim et al. | 348/14.02 |

* cited by examiner

*Primary Examiner* — Parth Patel
*Assistant Examiner* — Jason Harley
(74) *Attorney, Agent, or Firm* — Bryan Webster; Dan Choi; Micky Minhas

(57) ABSTRACT

A mediation server for controlling contents of incoming and outgoing communication information exchanged as part of a conversation is provided. The mediation server may be a centralized server between an internal (private) network and an external network, utilized for enforcing the internal network's policy and detecting a potential security compromise in the internal network. Predefined evaluation criteria are utilized to enforce internal policy or security policy within the internal network. When communication information is exchanged, the mediation server may monitor potential policy or security breaches in the communication information utilizing the predefined evaluation criteria and execute an appropriate action to prevent potential policy or security breaches.

20 Claims, 17 Drawing Sheets

VOIP COMMUNICATION CONTENT CONTROL

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, the current VoIP approach may not provide a method or system to allow a conversation while filtering contextual and/or voice data packets that may contain sensitive information

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

A mediation server for controlling contents of incoming and outgoing communication information exchanged as part of a conversation is provided. The mediation server may be a centralized server between an internal (private) network and an external network, utilized for enforcing the internal network's policy and detecting a potential security compromise in the internal network. Predefined evaluation criteria are utilized to enforce internal policy or security policy within the internal network. When communication information is exchanged, the mediation server may monitor potential policy or security breaches in the communication information utilizing the predefined evaluation criteria and execute an appropriate action to prevent potential policy or security breaches.

In an aspect of the present invention, a method for managing a conversation on a communication channel is provided. Communication information relating to a conversation on a communication channel may be obtained. The communication information may be obtained from a sending computing device within an internal network and addressed to at least one recipient computing device outside of the internal network. The communication information relating to a conversation may correspond to one or more packets (voice data packets) of voice information and one or more packets (contextual data packets) of contextual information related to the conversation. The obtained communication information is processed according to a set of evaluation criteria. An output corresponding to the processed communication information may be generated.

In one embodiment, the undesirable part of contextual information is filtered from the obtained contextual information and updated contextual information may be generated as the output. In addition, a notification message may be generated and sent to the sending computing device or other locations to indicate the processing of the communication information according to the set of evaluation criteria. In another embodiment, voice information may be interrupted or blocked from being transmitted upon detection of potential policy or security breaches based on the set of evaluation criteria. Alternatively, portion of the voice information, including potential policy breaches or potential security breaches, may be muted. Subsequently, additional communication information such as warning voice information or a notification message may be included as part of the communication information. The communication information (output) is updated accordingly.

In another aspect of the present invention, a system for managing a conversation on a communication channel is provided. The system may include a first and a second computing device that exchange voice information and/or contextual information relating to a conversation over a communication channel. The system may further include a processing computing device that monitors and processes communication information (voice information and/or contextual information) exchanged between the first and second computing devices via the communication channel according to a set of evaluation criteria. The processing computing device generates and transmits output communication information that has been updated based on the processing of the information according to the set of evaluation criteria. The processing computing device further generates additional communication information that is indicative of the result of the processing of the set of evaluation criteria. The additional communication information will be transmitted to the first and second computing devices.

In yet another aspect of the present invention, a computer-readable medium having computer-executable components managing a conversation on a communication channel is provided. The computer-executable components may include a communication component for obtaining communication information via a communication channel between a first and second computing device. The communication information relating to a conversation corresponds to one or more packets of voice communication information and one or more packets of contextual information related to the conversation. The computer-executable components may include an information processing component for processing the information exchanged between the first and second computing devices via the communication channel according to as set of evaluation criteria. The computer-executable components further include an output component for generating output based on the processing of the information according to the set of evaluation criteria. The information processing component associates one or more values to the information exchanged between the first and second computing devices and processes the information according to a set of evaluation criteria that includes determining whether the determined value for the information matches a predetermined value. The first computing device corresponds to a first communication network and the second computing device corresponds to a second communication network wherein the communication component for obtaining information intercepts data packets between the first and second computing devices. The output component filters one or more packets of voice communication information and one or more packets of contextual information based on the result of the processing of the communication information according to the set of evaluation criteria

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Generally described, the present invention relates to a method and system for controlling contents of incoming and outgoing voice and/or contextual information. More specifically, the present invention relates to an "edge server" for a network that is configured to control data packets based on a predetermined logic during a conversation over a communication channel. "Edge server," as used herein, is a centralized server between an internal (private) network and an external network that is utilized for enforcing the internal network's policy and detecting a potential security compromise in the internal network. While some of the communication information that contains prohibited information may be blocked, interrupted, or muted from communicating by the edge server, the contextual information may be updated by extracting the undesirable contextual data packets that contain prohibited information and represented according to "structured hierarchies." "Structured hierarchies," as used herein, are predefined organizational structures for arranging contextual information to be exchanged between two or more VoIP devices. For example, structured hierarchies may be XML namespaces. Further, a VoIP conversation is a data stream of information related to a conversation, such as contextual information and voice information, exchanged over a conversation channel. Suitable user interfaces adaptive to contextual information may be utilized to collect further contextual information. Although the present invention will be described with relation to illustrative structured hierarchies and an IP telephony environment, one skilled in the relevant art will appreciate that the disclosed embodiments are illustrative in nature and should not be construed as limiting.

Figure 1:
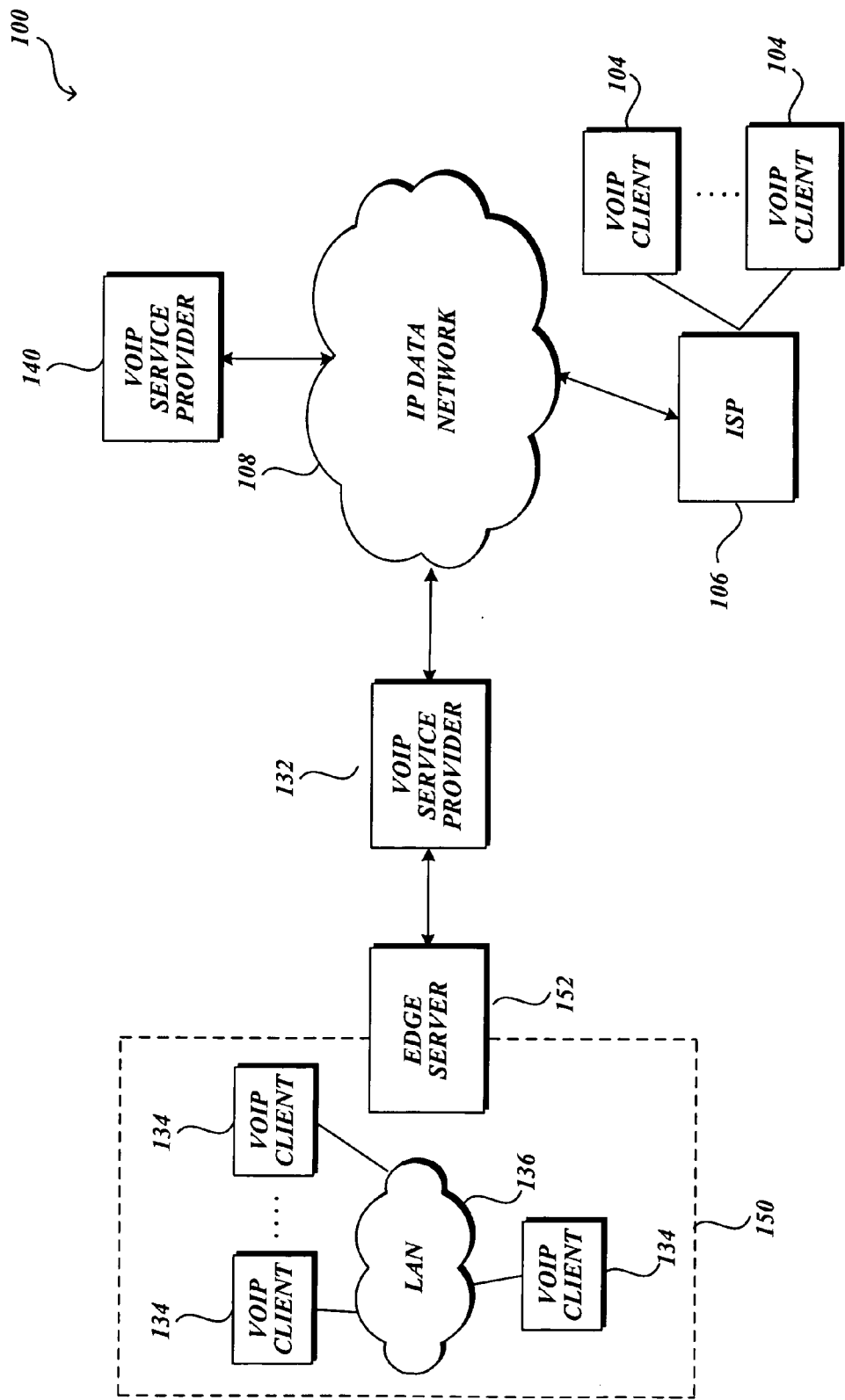
FIG. 1 is a block diagrams illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices, and a unique VoIP client identifier collectively make up a VoIP client. Similarly, a company including 500 individuals and over 1,000 associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Referring to FIG. 1, the IP telephony environment 100 may include an IP data network 108 such as the Internet, an intranet network, a wide area network (WAN), a local area network (LAN), and the like. The IP telephony environment 100 may further include VoIP service providers 132, 140 providing VoIP services to VoIP clients 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 132, 140 may provide various calling features, such as incoming-call filtering, text data, voice and media data integration, and the integrated data transmission as part of a VoIP call conversation. VoIP clients 104, 136 may collect, maintain, and provide contextual information relating to a request signal for a communication channel. In addition, the VoIP service providers 132, 140 may be any VoIP related service providers, including a call center, a customer support center, a VoIP service provider, an interactive e-commerce server, a centralized client information management server, and the like. The VoIP service providers 132, 140 also collect, maintain, and provide a separated set of information (e.g., provider contextual information) for providing services (requested, self-configured) for VoIP clients 104, 134 communicating in a call conversation. The VoIP service providers 132, 140 may route a request signal for a communication channel to an appropriate destination and contextual information, which may assist the appropriate destination in providing the requested service.

VoIP service providers 132 may be coupled to a private network 150 and may include a company LAN 136 and several VoIP clients 134. Such VoIP service provider(s) provides IP telephone services (e.g., internal calls within the private network, external calls outside of the private network, and the like) and multimedia data services to several VoIP clients 134 communicatively connected to the company LAN 136. In one embodiment, the private network 150 may include one or more edge server(s) 152 to control contents of incoming and/or outgoing communication information (voice, media, contextual information, etc.). The edge server 152 may be any suitable server that can control contents of communication information, such as a centralized server, a gateway, a security server behind a firewall of a network, etc. In one embodiment, the edge server 152 may interrupt, block, or terminate an incoming call from a certain caller or filter an incoming call that contains prohibited information. The edge server 152 may further control contents of outgoing calls. For example, if a VoIP client 134 within the private network 150 transmits contextual information that is potentially related to classified information, the contextual information may be removed from the conversation. In this embodiment, all incoming and outgoing information may be funneled into the edge server before the information goes out from or comes in to the private network 150. In another embodiment, the edge server 152 may monitor and log calling behaviors of VoIP clients within the private network 150.

In one embodiment, one or more Internet Service Providers (ISP) 106 may be configured to provide Internet access to VoIP clients 104 so that the VoIP clients 104 can maintain conversation channels established over the Internet. The VoIP clients 104 connected to the ISP 106 may use wired and/or wireless communication lines.

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104 with or without VoIP service providers 132 or ISP 106. Further, an ISP 106 can also provide VoIP services to its client.

Figure 2:
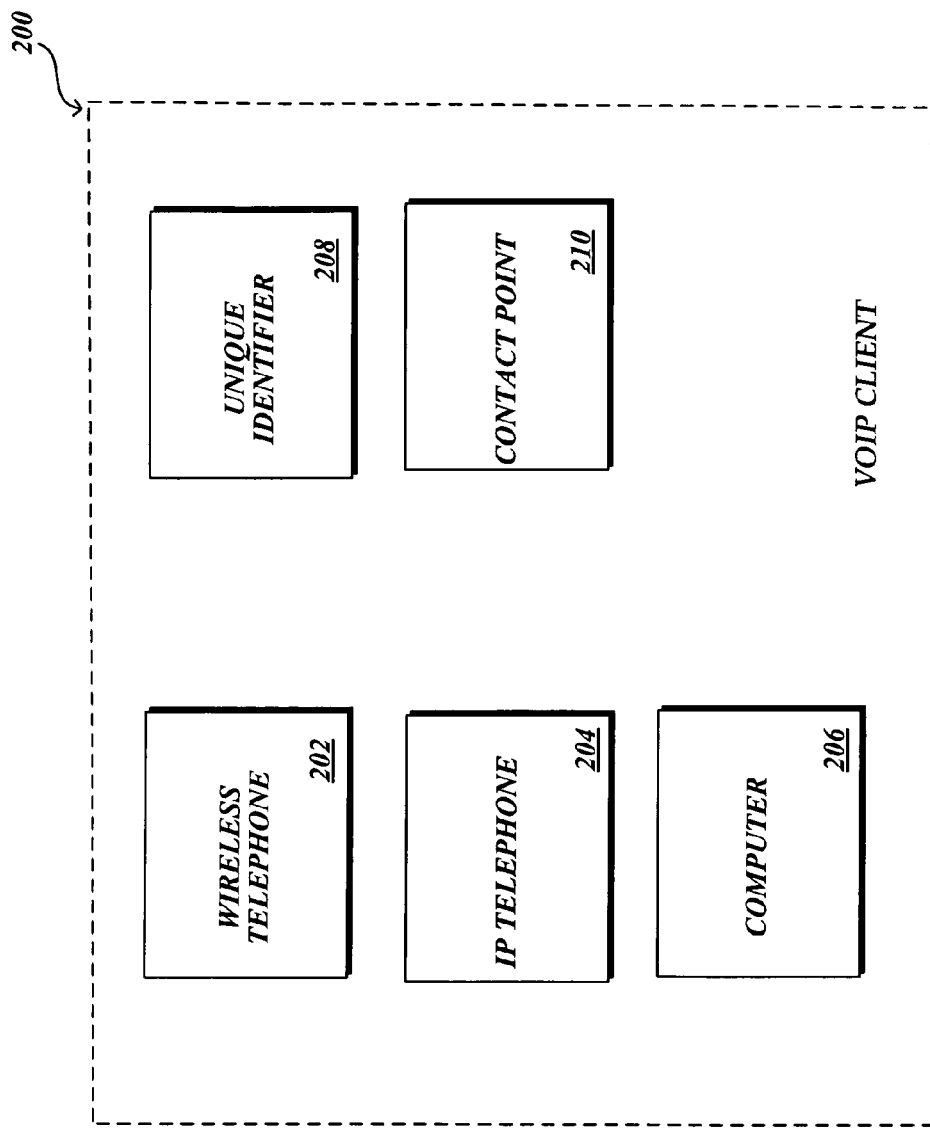
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively or in addition thereto, a separate storage maintained, for example, by a service provider, may be associated with the VoIP client and be accessible by each VoIP device that contains information relating to the VoIP client. In an embodiment, any suitable VoIP device, such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In an alternative embodiment, the VoIP client 200 may maintain multiple VoIP identifiers. In this embodiment, a unique client identifier may be temporarily assigned to the VoIP client 200 for each call session.

The unique client identifier may be used similarly to a telephone number in PSTN. However, instead of dialing a typical telephone number to ring a specific PSTN device, such as a home phone, the unique client identifier is used to reach a contact point, such as an individual or company that is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual using a personal computer (VoIP device) makes a phone call to a PSTN client, the VoIP client identification number in conjunction with an IP address of the personal computer will eventually be converted into a telephone number recognizable in PSTN.

Figure 3:
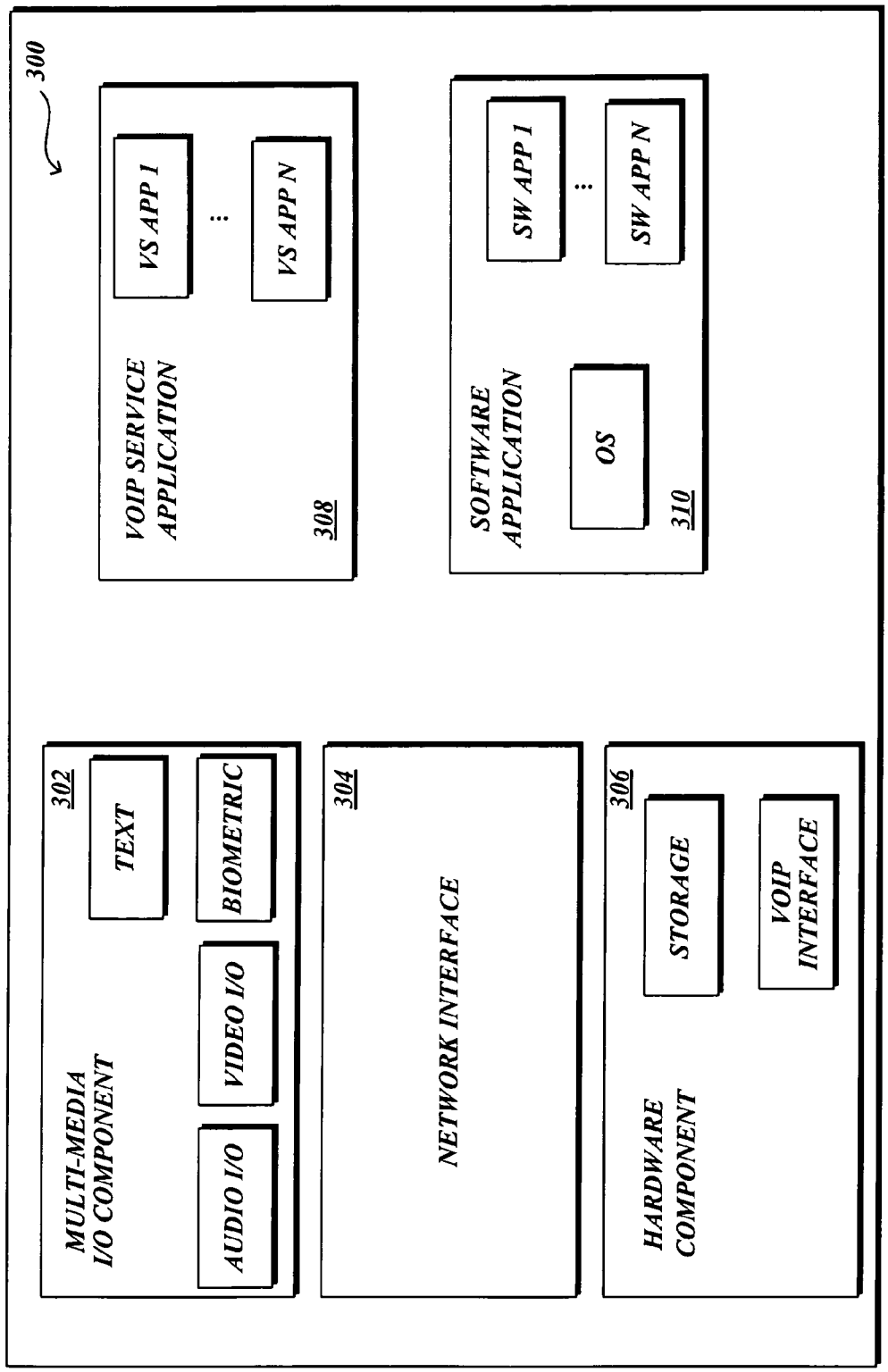
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting, and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces, such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage, such as read-only memory devices (ROM), random access memory (RAM), hard drives, optical drives, and the like. The storage may be configured to store program instructions for controlling the operation of an operating system and/or one or more applications, and to store contextual information related to individuals (e.g., voice profiles, user biometric information, etc.) associated with the VoIP client in which the device is included. In one embodiment, the hardware component 306 may include a VoIP interface card that allows a non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
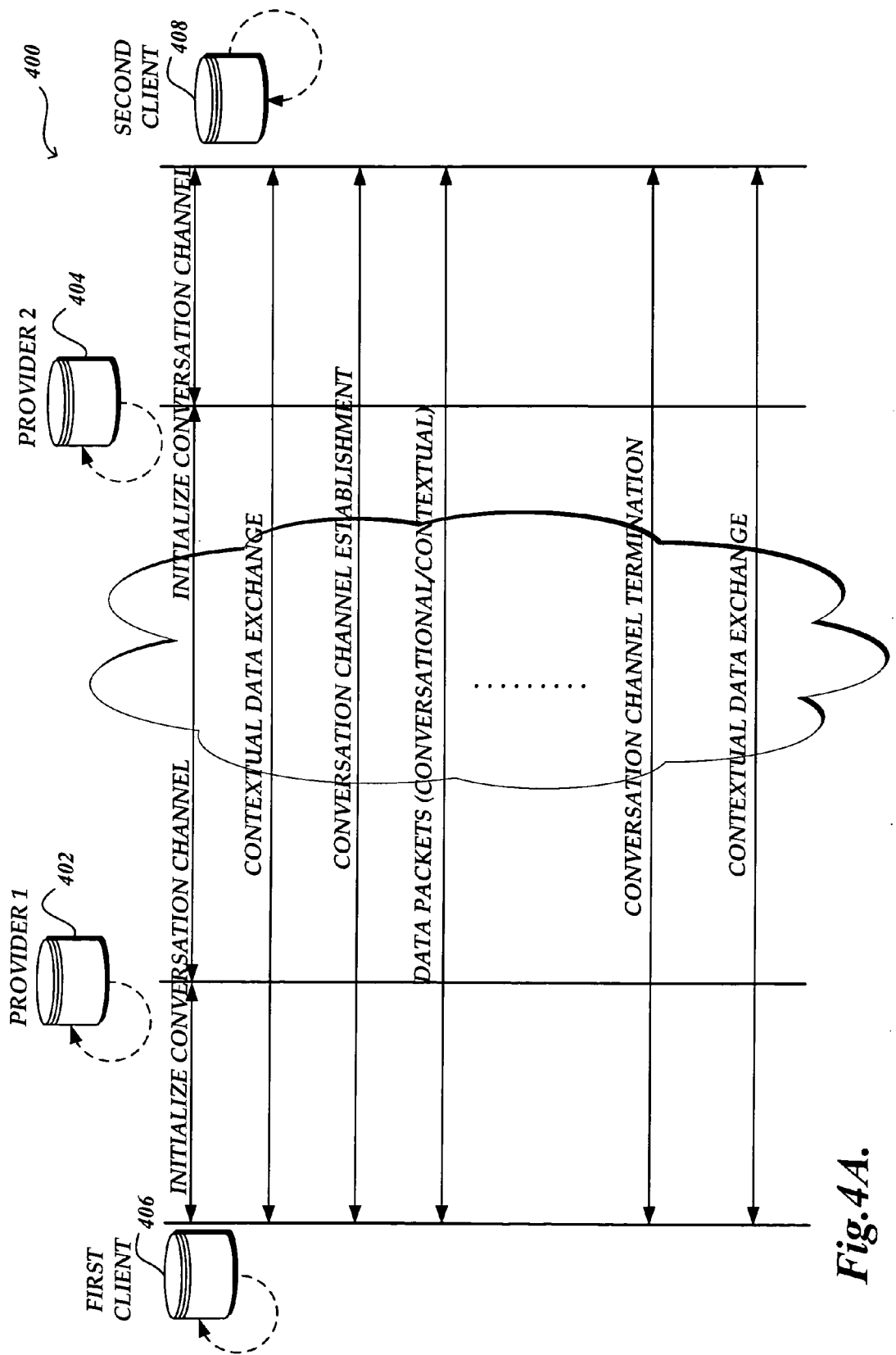
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer-to-peer context, communication between VoIP devices may also be direct without having any service providers involved.

There are a variety of protocols that may be selected for use in exchanging information between VoIP clients, VoIP devices, and/or VoIP service providers. For example, when session initiation protocol (SIP) is selected for a signaling protocol, session control information and messages will be exchanged over a SIP signaling path/channel and media streams will be exchanged over a real-time transport protocol (RTP) path/channel. For the purpose of discussion, a communication channel, as used herein, generally refers to any type of data or signal exchange path/channel. Thus, it will be appreciated that, depending on the protocol, a connection set-up phase and a connection termination phase may require additional steps in the conversation flow 400.

For ease of explanation, we will utilize the example in which the first VoIP client 406 and the second VoIP client 408, each include only one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information.

In one embodiment, the exchanged contextual information may include information relating to the calling VoIP client 406, the device, and the VoIP client 408 being called.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
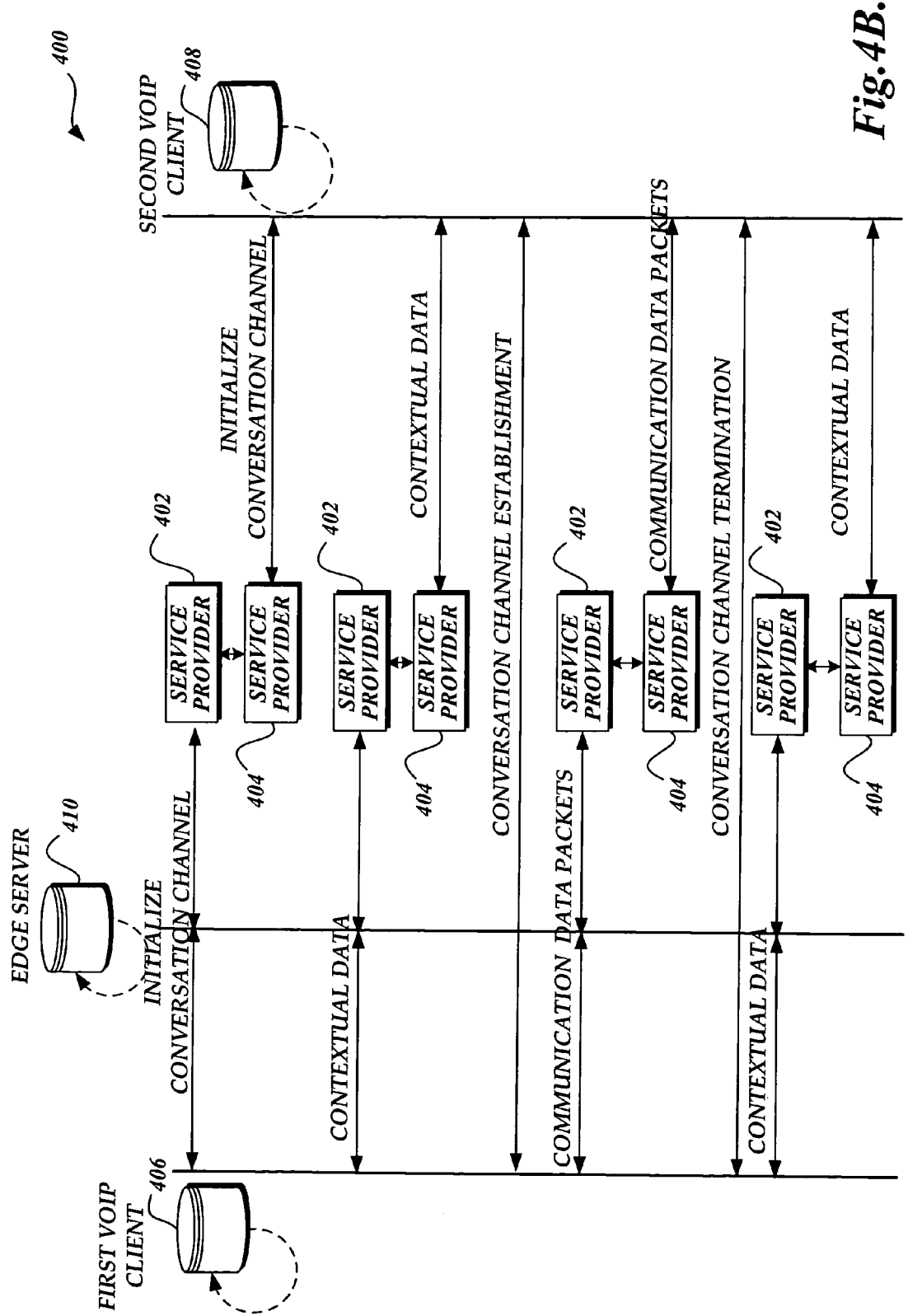

FIG. 4B is a block diagram illustrative of a conversation flow 400 between devices of two VoIP clients via an edge server and several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, an edge server 410 coupled to a network where the first VoIP client 406 resides may receive the request to initiate a conversation channel and forward the request to VoIP Service Providers (SP) 402, 404. In one embodiment, the edge server 410 may maintain information of undesirable destinations of a conversation, for example, a prohibited callee list. In this embodiment, the edge server 410 may compare destination information of the call (i.e., the second VoIP client 408) against information regarding prohibited callees (e.g., a prohibited callee list). The edge server 410 may terminate the request to initiate a conversation channel (e.g., a call-initiation signal) if the second VoIP client is determined to be an undesirable destination. For example, a minor user may not be allowed to call any toll free number under a parental control. When a minor user sends a call-initiation signal to a certain toll free number, the edge server 410 may terminate the call-initiation signal and send a warning message to the minor user and a notification message to the parent of the minor user, along with the information regarding the attempted call number. In one embodiment, the edge server 410 may interrupt the call-initiation signal and request permission from the parent. Upon receipt of the permission, the interrupted call-initiation signal may be transmitted to a service provider (SP) 402.

In an illustrative embodiment, the edge server 410 may reject a call-initiation signal destined to the first VoIP client 406 if the call-initiation signal is received from a certain prohibited caller within an external network. In this embodiment, the edge server 410 may maintain information regarding undesirable callers for the private network (e.g., prohibited caller list, etc.).

After the device of the first VoIP client 406 successfully transmits a call-initiation signal to the device of the second VoIP client 408 via the edge server 410, contextual information may be exchanged between the first VoIP client 406 and the second VoIP client 408 before a communication channel is established. The contextual information may be exchanged using a structured organization defined by the first VoIP client 406. In one embodiment, SP 402 may identify particular contextual information that SP 402 desires to obtain from the first VoIP client 406. The first VoIP client 406 may specify the corresponding structure based on the content of the contextual information. The identification of the structure for exchanging information and additional contextual information may be transmitted to the second VoIP client 408 via SP 402 and SP 404. The contextual information may be processed and collected at a device of the first VoIP client, a device of the second VoIP client, and/or the VoIP service providers (e.g., SP 402, SP 404), depending on the nature of the contextual information.

As will be discussed in greater detail below, the edge server 410 of the first VoIP client 406 may control the content of contextual information exchanged between the first VoIP client 406, SP 402, SP 404, and the second VoIP client 408. In one embodiment, the edge server 410 may monitor incoming or outgoing communication data packets (including contextual data packets and voice data packets) to/from VoIP clients (e.g., first VoIP client 406) in the private network. Upon detection of undesirable content in contextual data packets, the edge server 410 may delete such data packets from the incoming or outgoing contextual information stream. In one embodiment, the edge server 410 may add more information, for example, notification, warning, and the like, to the contextual information. The contextual information will be updated accordingly and forwarded to its destination. In an alternative embodiment, the edge server 410 may terminate the communication channel upon detection of undesirable content. As will be discussed in greater detail below, the edge server 410 may maintain a predetermined set of criteria that is compared with the communication information to determine whether the communication information is allowed to be transmitted to the second VoIP client 408.

In response to the call-initiation signal, the second VoIP client 408 may accept the request for establishing a conversation channel or reject the request via SP 404. When a conversation channel has been established, the devices of the first VoIP client 406 and the second VoIP client 408 start communicating with each other by exchanging data packets, as discussed above. During a conversation, the edge server 410 monitors incoming or outgoing contextual and/or conversation (voice) data packets and detects undesirable data packets from the received data packets. In one embodiment, the edge server 410 may monitor specific subjects, keywords, etc., from conversation data packets and upon detection of such information, the edge server 410 may interrupt, mute, or terminate the conversation. Alternatively, the edge server 410 may reroute the communication channel to a third client in the private network, which has authority to investigate undesirable calling activities of the first client 106. The first client 406 may be notified accordingly. As such, the edge server 410 may receive all communication data packets destined to VoIP clients in the private network and monitor the received communication data packets at anytime during a conversation and even after termination of the conversation.

Figure 5:
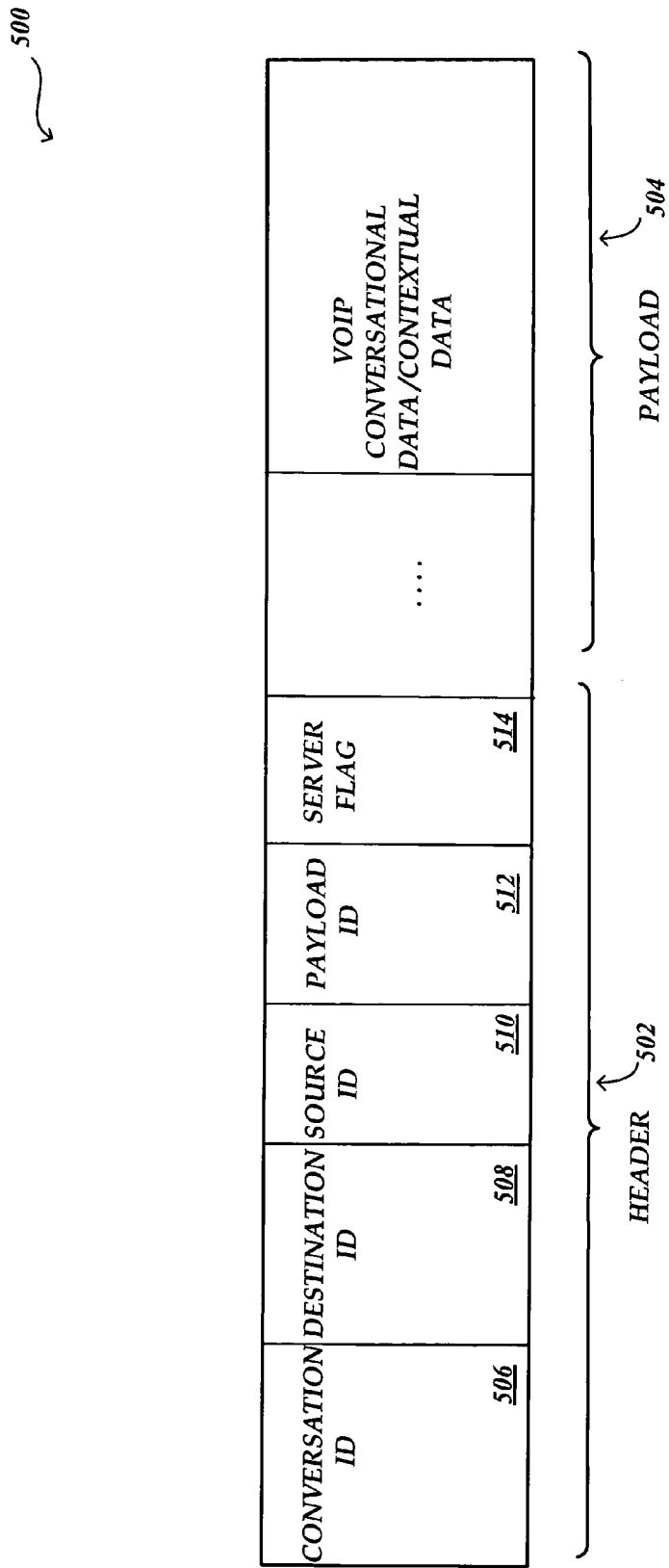
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a destination ID 508, such as a unique VoIP identifier of the client being called, a source ID 510 (unique VoIP identifier of the calling client or device identifier), payload ID 512 for identifying the type of payload (e.g., conversation or contextual), individual ID (not shown) for identifying the individual to whom the conversation data is related, and server flag 514 for indicating whether it is filtered, cleared to transmit, or the like. Server flag 514 may be utilized to indicate the results of the matching process of communication information with a corresponding set of criteria in the edge server. In an alternative embodiment, the header 502 may contain information regarding Internet protocol versions and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, the VoIP device's functionality, the VoIP service provider's information, media type, media parameters, calling number priority, keywords, information relating to application files, and the like. The contextual information may be processed and collected at each VoIP client and/or the VoIP service providers, depending on the nature of the contextual data. In one aspect, the VoIP service providers may add, modify, and/or delete the VoIP client's contextual data before forwarding the contextual information. For example, a client's confidential information will be deleted by the VoIP service provider associated with that client unless the client authorizes such information to be transmitted. In some cases, a minimal amount of contextual information is transmitted outside of an intranet network.

Figure 6:
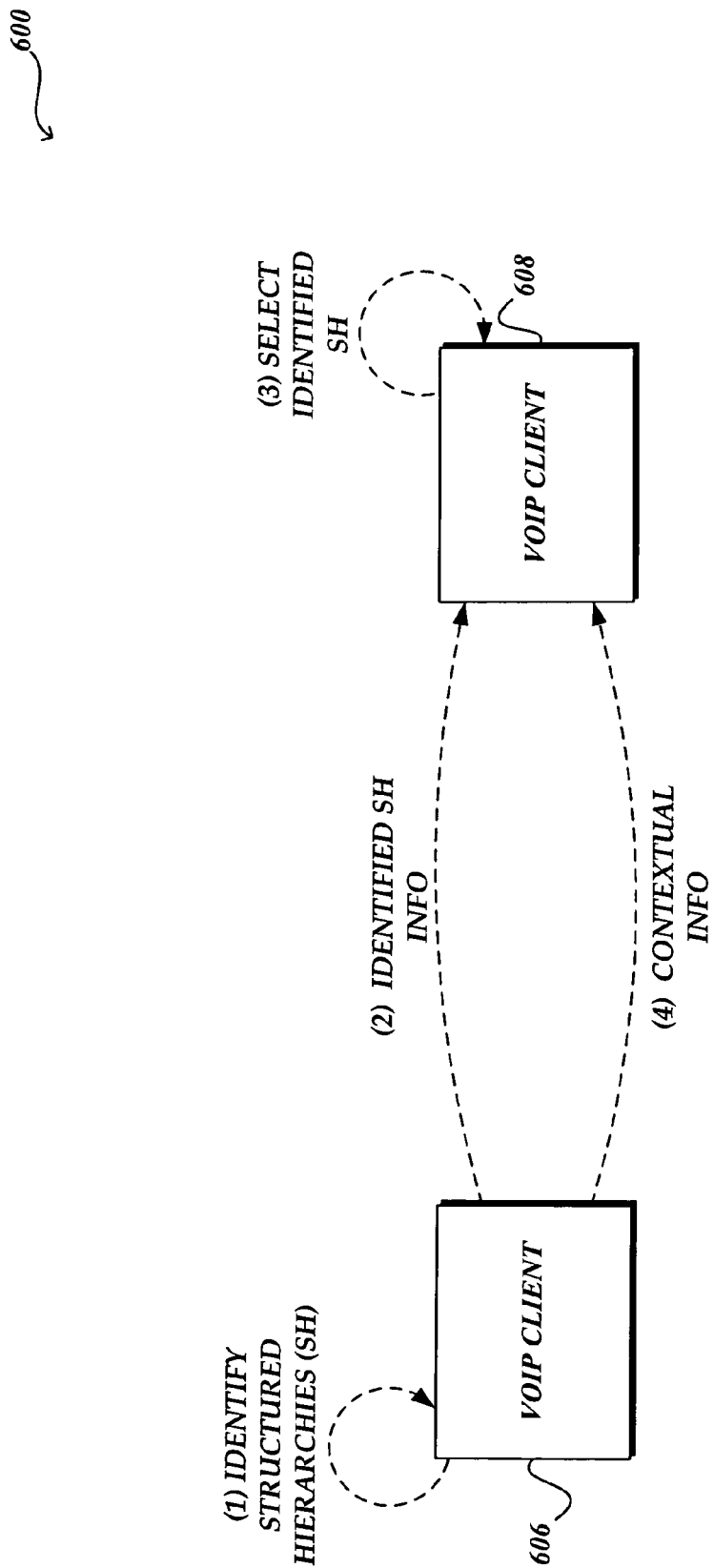
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4A, the example described herein will utilize the scenario in which each client only has one device associated therewith and the connection occurs between those two devices. In one embodiment, devices of VoIP client 606 and VoIP client 608 have established a VoIP conversation channel. It may be identified as to which structured hierarchies will be used to carry certain contextual information by VoIP client 606. The information regarding the identified structured hierarchies may include information about which structured hierarchies are used to carry the contextual information, how to identify the structured hierarchy, and the like. Such information will be exchanged between VoIP client 606 and VoIP client 608 before the corresponding contextual information is exchanged. Upon receipt of the information identifying which structured hierarchy will be used to carry the contextual information, VoIP client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP client 606 to VoIP client 608.

In another embodiment, each VoIP client may have a set of predefined structured hierarchies stored in a local storage of any devices or a dedicated local storage that all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner that is independent of hardware and/or software.

Upon retrieving the identified structured hierarchy, VoIP client 608 is expecting to receive a data stream such that data packets corresponding to the data stream are defined according to the identified structured hierarchies. VoIP client 606 can begin sending contextual information represented in accordance with the identified structured hierarchies. In one embodiment, VoIP client 608 starts a data binding process with respect to the contextual information. For example, instances of the identified structured hierarchies may be constructed with the received contextual information.

Figure 7A:
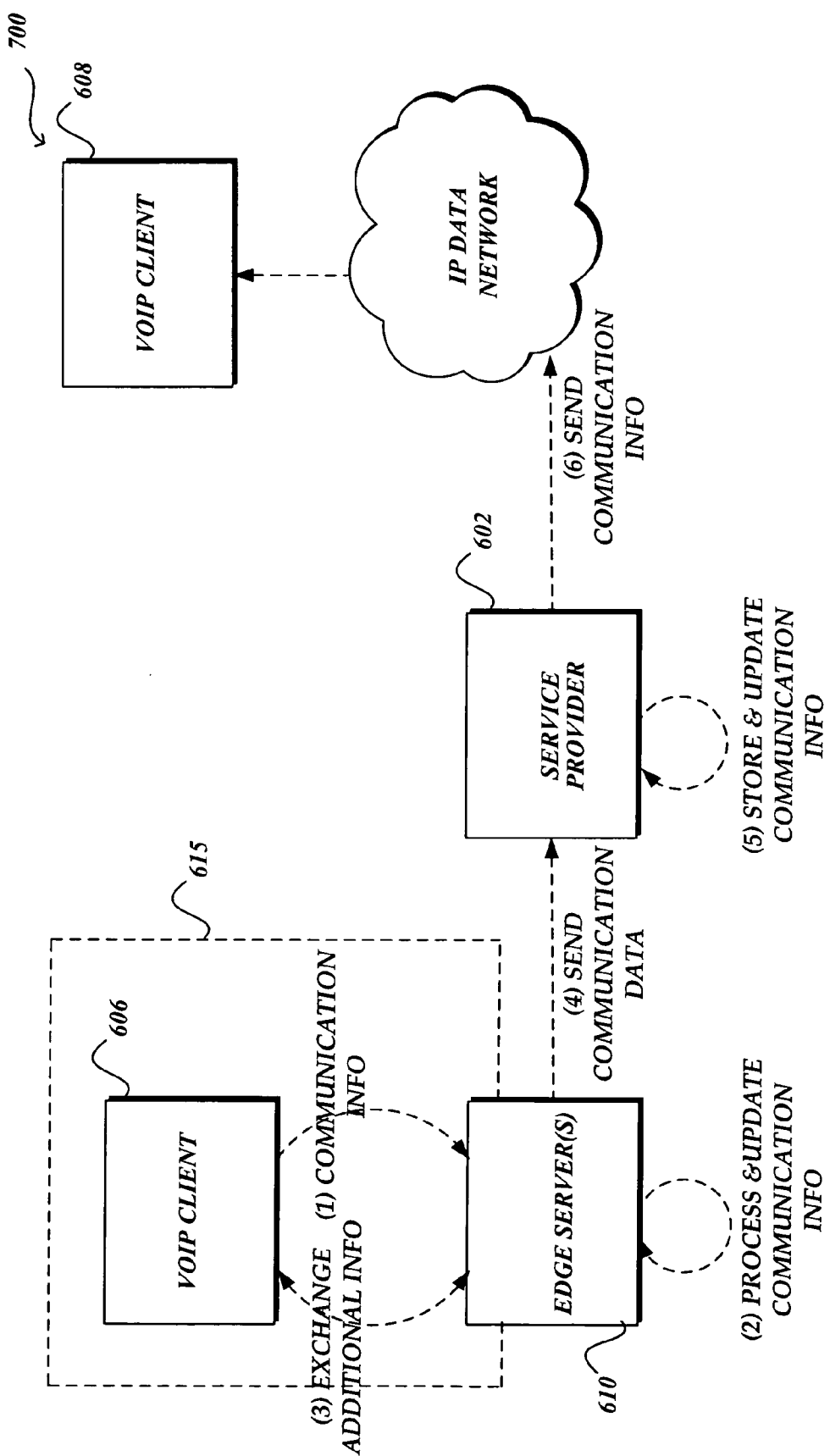
FIGS. 7A and 7B are block diagrams illustrating interactions between VoIP entities for collecting, filtering, and transmitting contextual information to a destination in accordance with an aspect of the present invention.
Figure 7B:
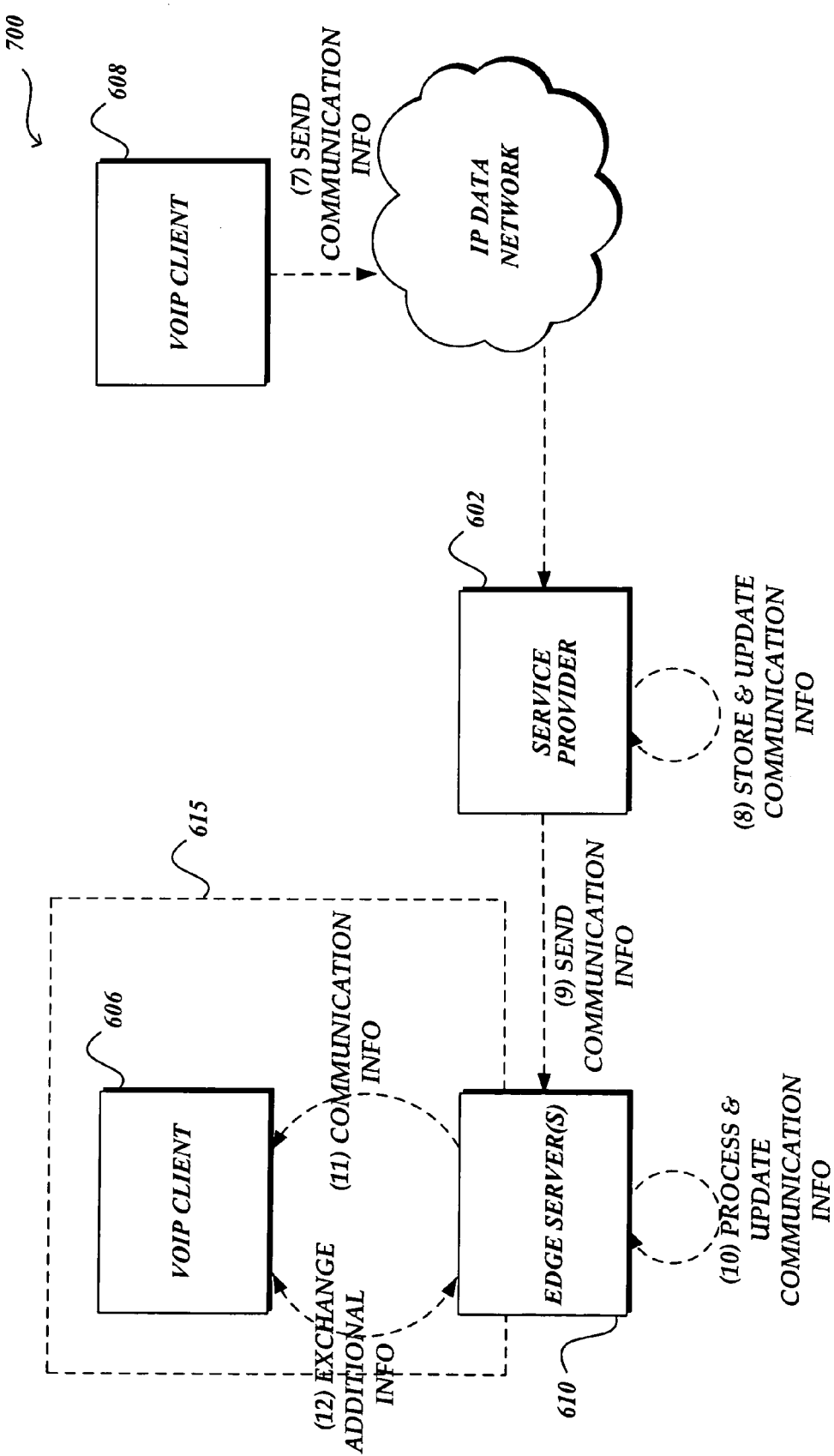

FIGS. 7A and 7B are block diagrams 700 illustrating the collection, the process, and the content control of communication information among VoIP entities in accordance with an embodiment of the present invention. In one embodiment, the VoIP entities may include VoIP clients, an edge server coupled to an inter network (private network), VoIP service providers, third party service providers, and the like. Among VoIP entities, communication information may be exchanged using predefined structured hierarchies, such as XML namespaces. For discussion purposes, assume that VoIP client 606 is part of a private network 615 and Edge Server 610 monitors incoming and outgoing communication information to/from the private network. The private network 615 and VoIP client 608 have SP602 for the VoIP service provider. VoIP client 606 and VoIP client 608 have established a conversation channel between devices of VoIP client 606 and VoIP client 608 via SP 602. Edge Server 610 can receive communication information of VoIP clients 608 from SP 602. While this example utilizes a VoIP service provider, an edge server, and two VoIP clients, any number and combination of VoIP clients, service providers, edge servers and/or third party service providers may be used with embodiments of the present invention. Further, SP 602 may be a service provider on premises (e.g., part of a client if the client is a corporation) or a service provider off premises (an external service provider).

With reference to FIG. 7A, in one embodiment, VoIP client 606 may collect contextual information as part of communication information and identify structured hierarchies that will be used to carry the collected contextual information. The collected contextual information is transmitted from VoIP client 606 to Edge Server 610 utilizing the identified structured hierarchies. Edge Server 610 may process the received contextual information based on the identified structured hierarchies and identify a set of evaluation criteria. Similarly, voice information as part of communication information is transmitted from VoIP client 606 to Edge Server 610. Edge Server 610 may process the received voice information and identify a set of evaluation criteria.

Edge Server 610 may determine whether the communication information meets the set of criteria. If the communication information does not meet the set of criteria, Edge Server 610 may execute appropriate actions based on predetermined rules of the private network. For example, Edge Server 610 may identify part of the received communication information to be removed before transmitting the communication information, and then update the received communication information accordingly. In this example, Edge Server 610 may maintain predetermined rules, several sets of evaluation criteria, policies, etc., regarding allowable contents, unallowable contents, a level of sensitivity, a level of security, and the like. In an illustrative embodiment, while processing the received contextual information, Edge Server 610 may identify and obtain additional contextual information relating to the conversation, and update the received contextual information accordingly. Edge Server 610 may store log information of the removed and/or updated contextual information for future analysis of the communication information. Similarly, Edge Server 610 may add proper voice warning information to the received voice information and store log information of the warning information. Edge Server 610 may transmit the updated communication information and/or the additional information to SP 602. SP 602 may forward the communication information to VoIP client 608.

In one embodiment, SP 602 may further process the communication information. While processing the received communication information, SP 602 may identify additional contextual information to be transmitted to VoIP client 608, and update the contextual information of the received communication information accordingly. Further, while processing the received communication information, SP 602 may identify a part of the contextual information of the received communication information to be further removed before transmitting the communication information to VoIP client 608, and then update the contextual information accordingly. In this example, SP 602 may transmit minimal or no contextual information to VoIP client 608. For example, VoIP client 608 may not need to receive any contextual information from VoIP client 606 or may not have devices with capabilities to process some of the contextual information.

In an illustrative embodiment, the information regarding the identified structured hierarchies is also transmitted to SP 602, or directly to VoIP client 606. The information regarding the identified structured hierarchies may include the information about which structured hierarchies are used to carry the contextual information, how to identify the structured hierarchies, and the like. In this embodiment, Edge Server 610 may forward the information regarding the identified structured hierarchies to SP 602 unless the policy of the network requires otherwise. In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically structured tree of nodes, each node comprising a tag that may contain descriptive attributes. Typically, an XML namespace is provided to give the namespace a unique name. In some instances, the namespace may be used as a pointer to a centralized location containing default information about the namespace.

In accordance with an illustrative embodiment, while the communication channel is being established, VoIP client 606 may identify an XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After SP 602 receives the XML namespace information, VoIP client 606 transmits a set of contextual data packets, defined in accordance with the identified XML namespace, to VoIP client 608. When a namespace is defined in the start tag of an element, all child elements with the same prefix are associated with the same namespace. As such, VoIP client 608 and VoIP client 606 can transmit contextual information without including prefixes in all the child elements, thereby reducing the amount of data packets transmitted for the contextual information.

Referring to FIG. 7B, in one embodiment, VoIP client 608 may send communication information destined to VoIP client 606 via SP 602. In an illustrative embodiment, while processing the received communication information from VoIP client 608, SP 602 may also identify additional contextual information to be transmitted to VoIP Client 606, and update the contextual information of the received communication information accordingly. Further, while processing the received communication information, SP 602 may identify a part of the contextual information of the received communication information to be further removed before transmitting the communication information to VoIP client 606 and then, update the contextual information accordingly. SP 602 may send the communication information to the private network 615. The communication information is received by Edge Server 610 coupled to the private network 615. As discussed above, all incoming communication information to the private network 615 may be funneled into Edge Server 610.

Edge Server 610 may process the received communication information and identify a set of evaluation criteria. If the communication information does not meet with the set of evaluation criteria, Edge Server 610 may identify an appropriate action. For example, potential security breaches are detected for the received communication information, Edge Server 610 may terminate the corresponding communication channel and reject any incoming communication information from VoIP client 608. Alternatively, Edge Server 610 may interrupt the corresponding communication channel and conduct further investigation. For example, Edge Server 610 may query some information from a third party service provider that is necessary to quarantine the communication information. If the communication information does meet with the set of evaluation criteria, Edge Server 610 may forward the communication information to VoIP client 606.

With reference to FIGS. 8A-8F, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass that corresponds to a subset of VoIP contextual information. For example, a VoIP namespace 800 may be defined as a hierarchically structured tree comprising a call basics class 802, a call contexts class 810, a device type class 820, a VoIP client class 830, and the like.

Figure 8A:
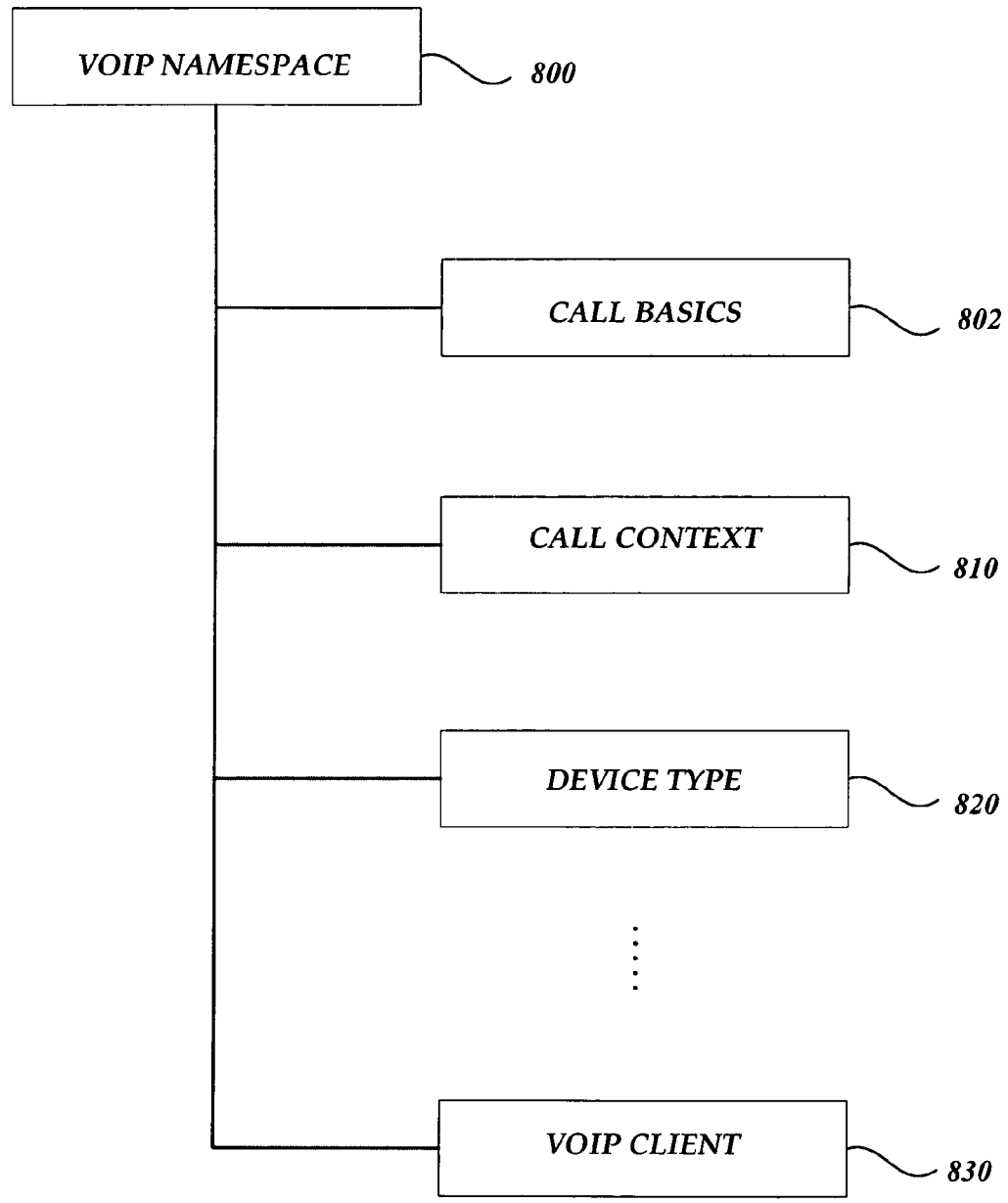
FIGS. 8A-8F are block diagrams illustrative of various attributes and classes of structured hierarchies corresponding to VoIP contextual information in accordance with an aspect of the present invention.
Figure 8B:
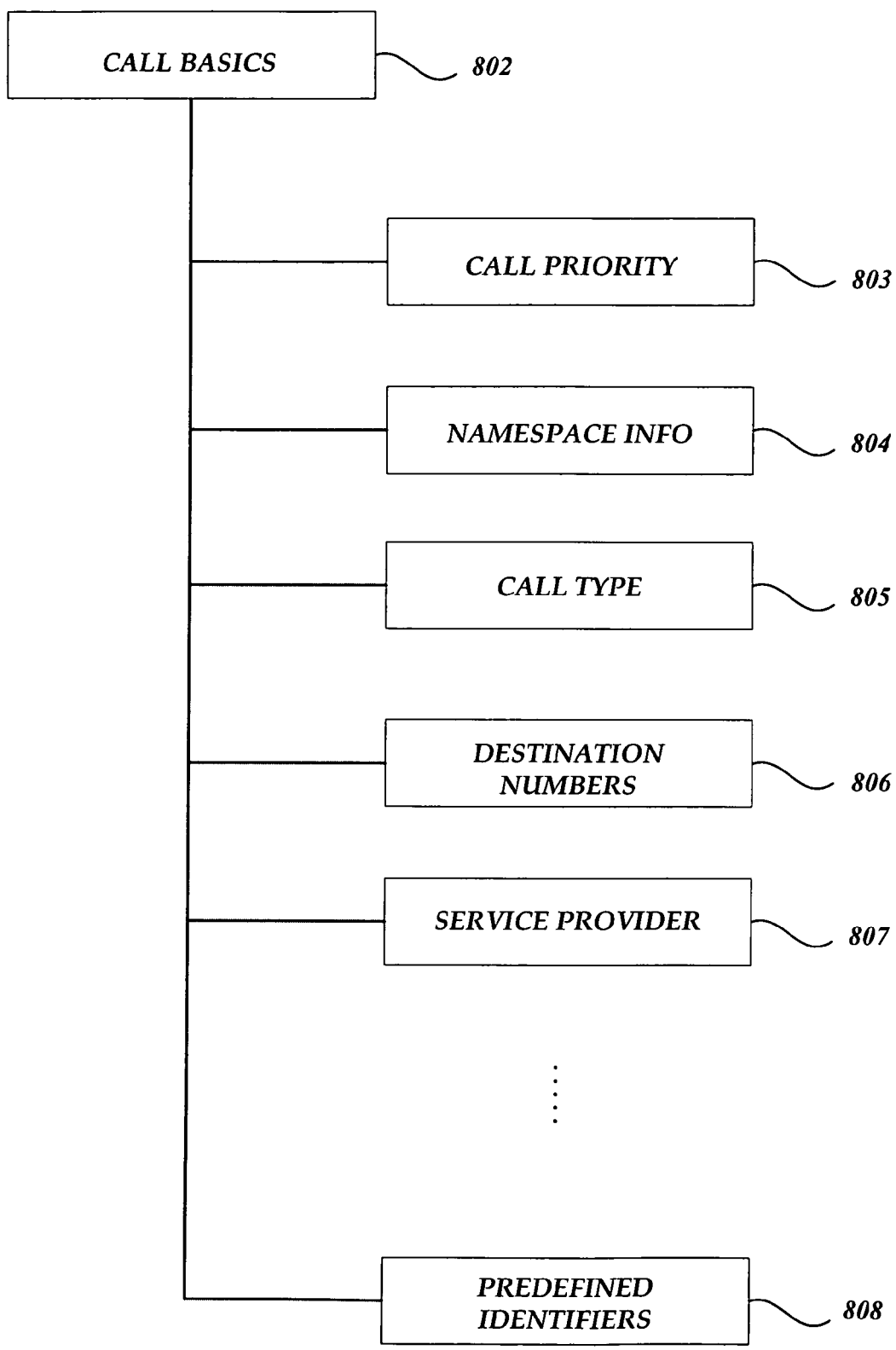

With reference to FIG. 8B, a block diagram of a call basics class 802 is shown. In an illustrative embodiment, call basics class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers, or telephone numbers), call connection time, VoIP service provider related information, and/or ISP related information, such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer-to-computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a call basics class 802 may be defined as a subtree structure of a VoIP namespace 800, which includes nodes such as call priority 803, namespace information 804, call type 805, destination numbers 806, service provider 807, predefined identifiers 808, and the like.

Figure 8C:
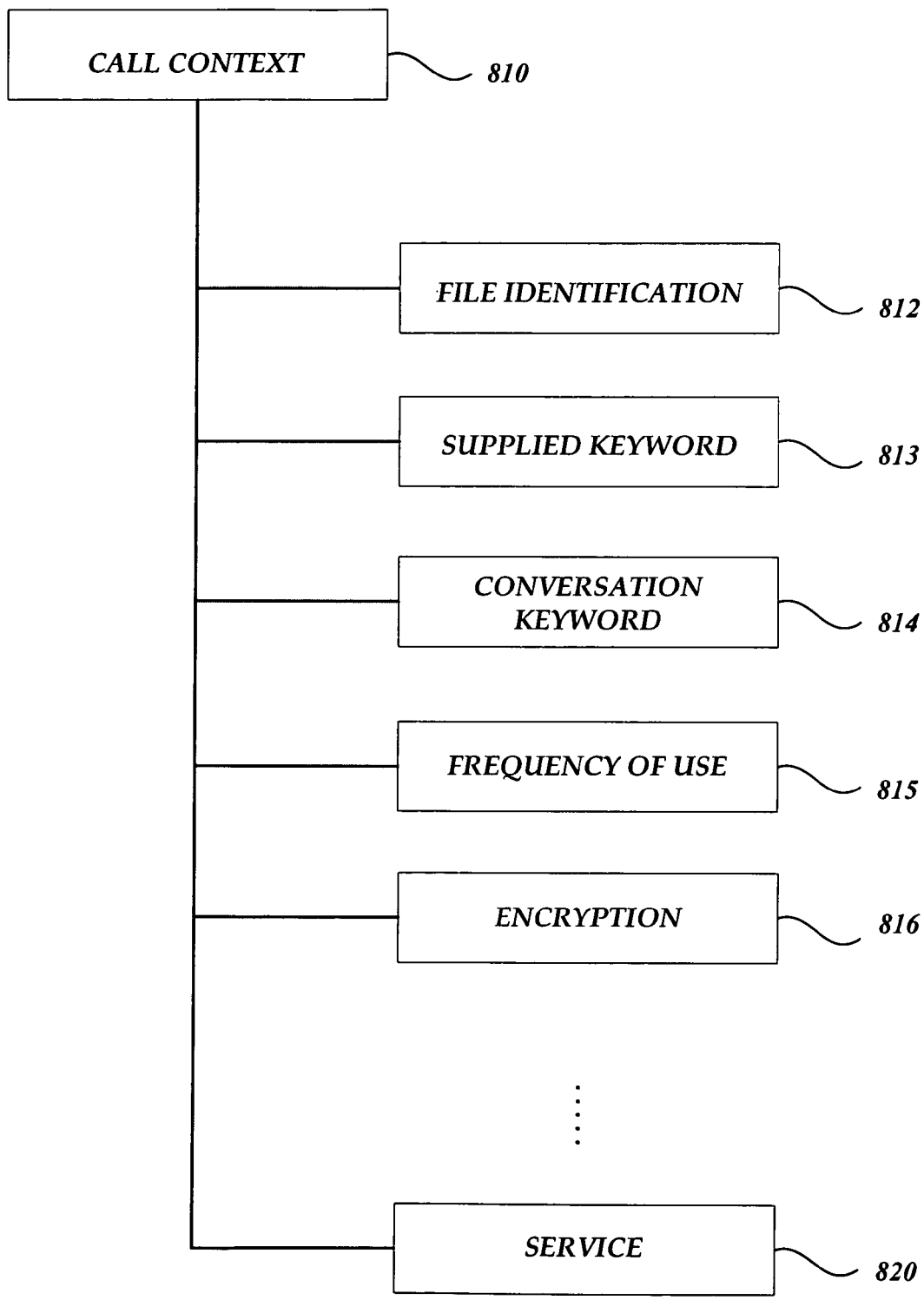

With reference to FIG. 8C, a block diagram of a call contexts class 810 is shown. In one embodiment, a subset of VoIP contextual information relating to conversation context may correspond to the call contexts class 810. The contextual information relating to conversation context may include information such as keywords supplied from a client, a service provider, network, etc., identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation). The contextual information relating to conversation context may further include information relating to encryption (whether and/or how to encrypt contextual information) and subject of service (a type or nature of the service when a client requests such service from a service provider), among many others. In accordance with an illustrative embodiment, a call contexts class 810 may be defined as a subtree structure of a VoIP namespace 800 that includes nodes corresponding to file identification 812, supplied keyword 813, conversation keyword 814, frequency of use 815, encryption 816, service 820, and the like.

Figure 8D:
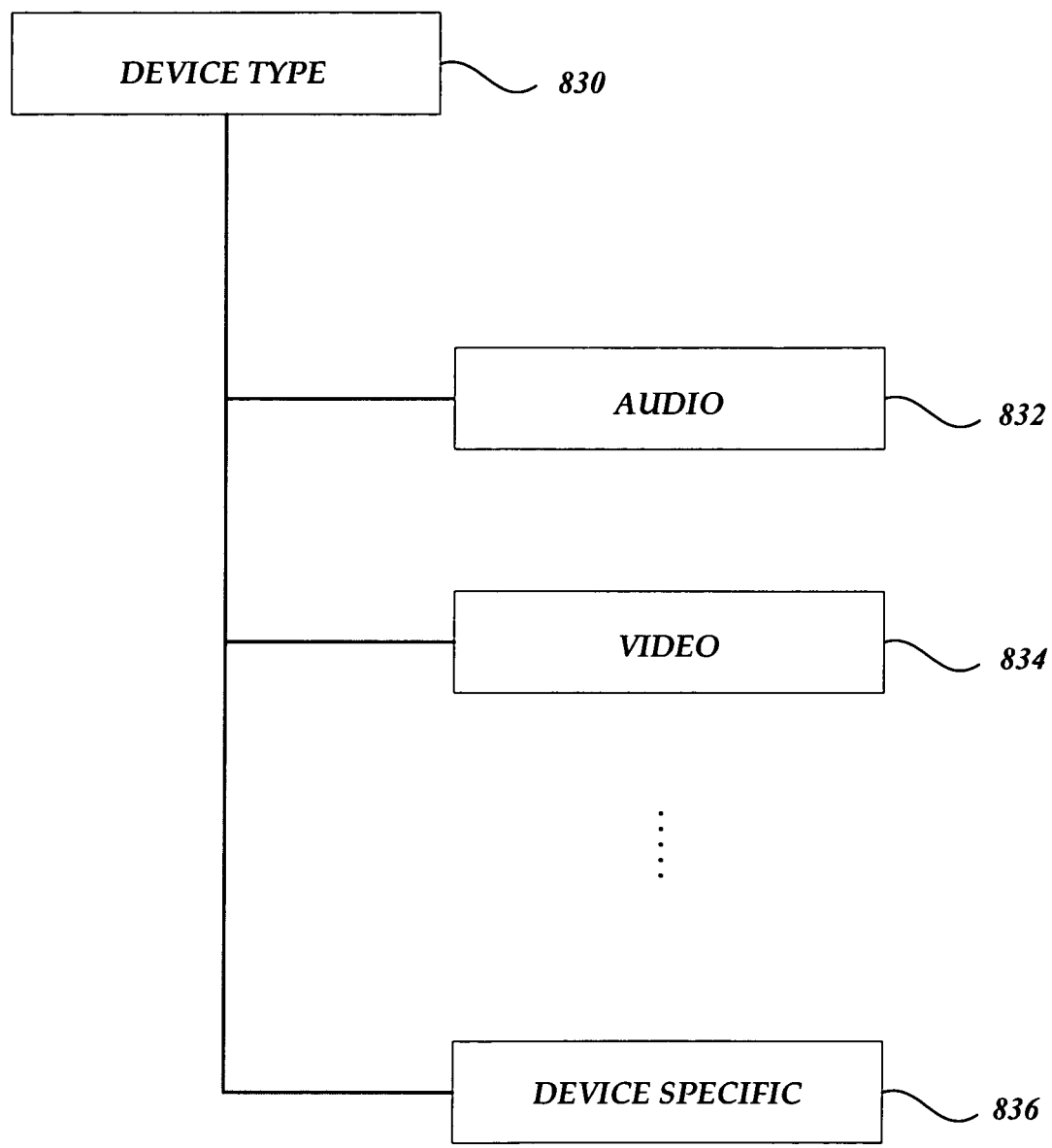

With reference to FIG. 8D, a block diagram of a device type class 830 is depicted. In one embodiment, a device type class 830 may correspond to a subset of VoIP contextual information relating to a VoIP client device used for the conversation channel connection. The subset 6f the VoIP contextual information relating to the VoIP client device may include audio related information that may be needed to process audio data generated by the VoIP client device. The audio related information may include information related to the device's audio functionality and capability, such as sampling rate, machine type, output/input type, microphone, digital signal processing (DSP) card information, and the like. The subset of the VoIP contextual information relating to the VoIP client device may include video related information that may be needed to process video data generated by the VoIP client device. The video related information may include resolution, refresh, type, and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a device type class 830 may be defined as a subtree structure of a VoIP namespace 800, which includes nodes corresponding to audio 832, video 834, device specific 836, and the like.

Figure 8E:
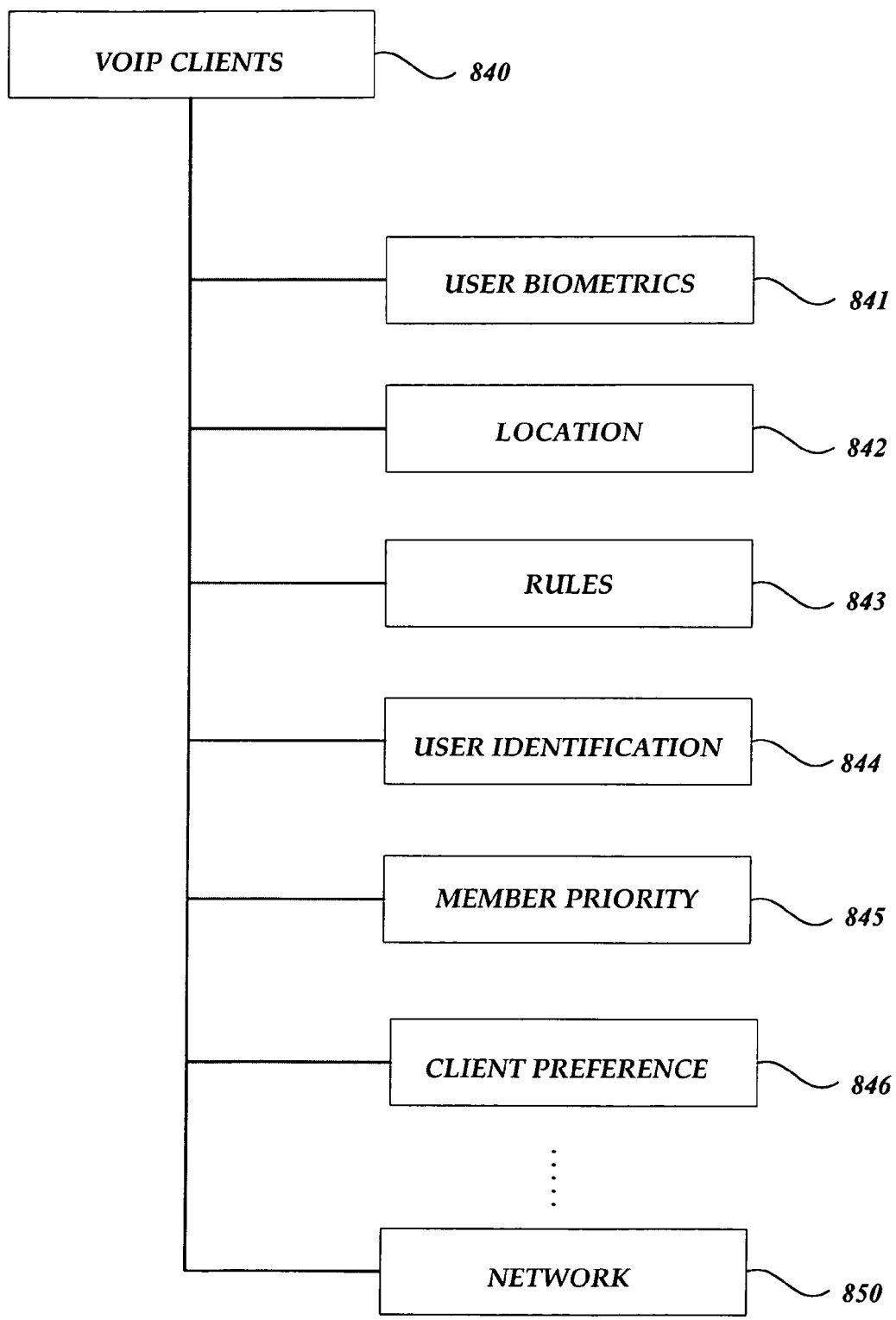

FIG. 8E depicts a block diagram of a VoIP client class 840. In accordance with an illustrative embodiment, a VoIP client class 840 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. As will be described in greater detail below, the subset of the VoIP contextual information relating to the VoIP client may include inter-network information. In one embodiment, a VoIP client class 840 may be defined as a subtree structure of a VoIP namespace 800, which includes nodes corresponding to user biometrics 841, user preference 842, rules 843, user identification 844, member priority 845, location 846, network 850, and the like.

Figure 8F:
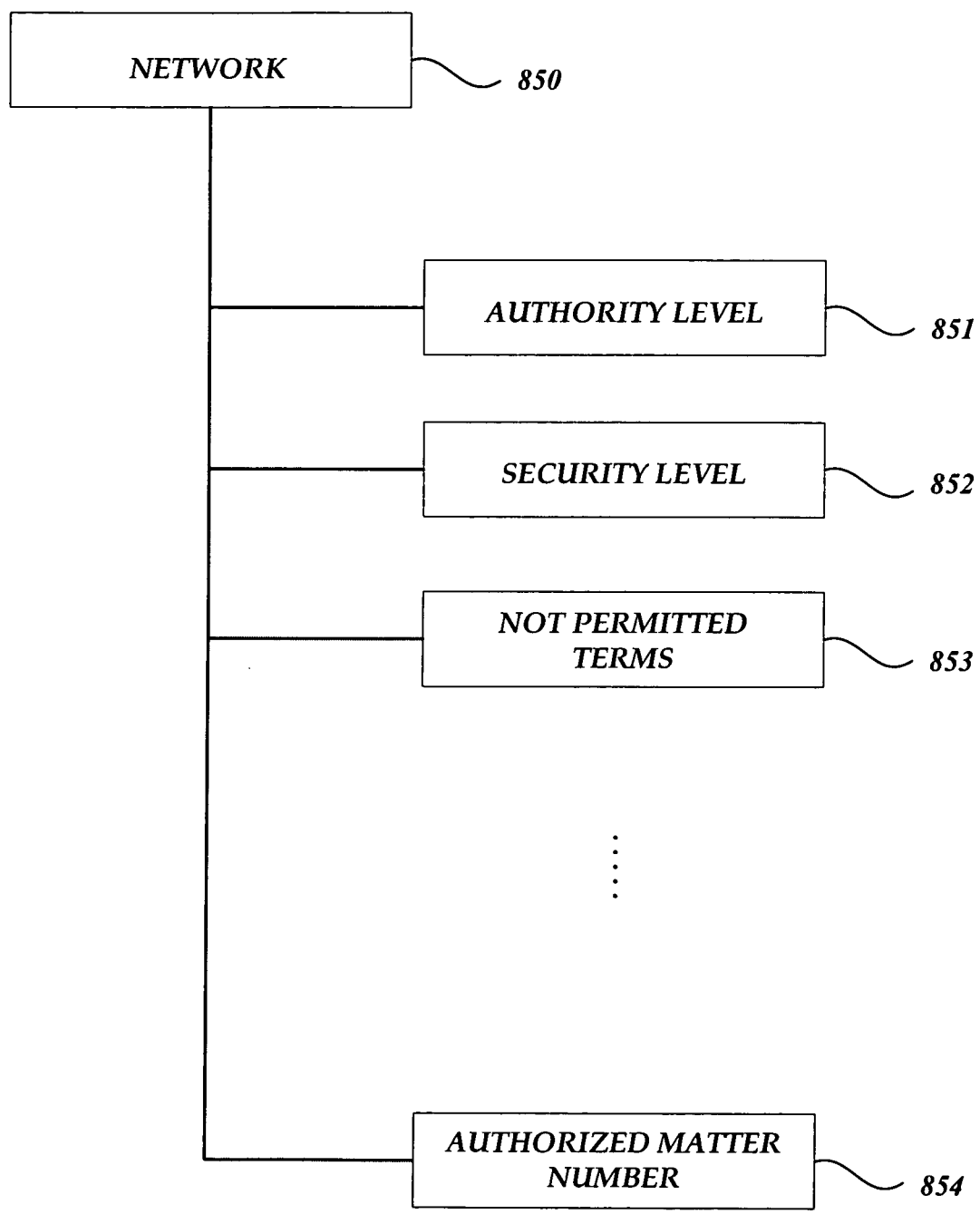

Referring to FIG. 8F, a block diagram of subclass network 850 is depicted. Network subclass 850 may correspond to a subset of contextual information relating to a private network associated with a client. In one embodiment, a subset of contextual information relating to a private network may include data security level information, undesirable content information that may not be transmitted outside of the private network, authorized case numbers, undesirable callee information, undesirable caller information, and the like. The data security level information can include level of security of data that the user is allowed to read, send, or update. For example, if the client has security level-1, the client may be able to received and send security level-1 information within the private network. The subset of the VoIP contextual information relating to the VoIP client may include authority level of the client in the organization. A higher authority user can permit lower authority to transmit some sensitive information if the higher authority user has such authority. The subset of the VoIP contextual information relating to the VoIP client may include undesirable callee or caller list for individual users. For example, the edge server may block a conversation channel to be established between a client in the network and one or more clients in external network from an undesirable (prohibited) callee or caller list. Further, the subset of the VoIP contextual information relating to the VoIP client may include undesirable content that may not be transmitted outside of the private network.

In one embodiment, a Network subclass 850 may be defined as a subtree structure of a VoIP client 840, which includes nodes corresponding to authority level 851, security level 852, not permitted terms 853, authorized matter number 854, and the like.

Figure 9:
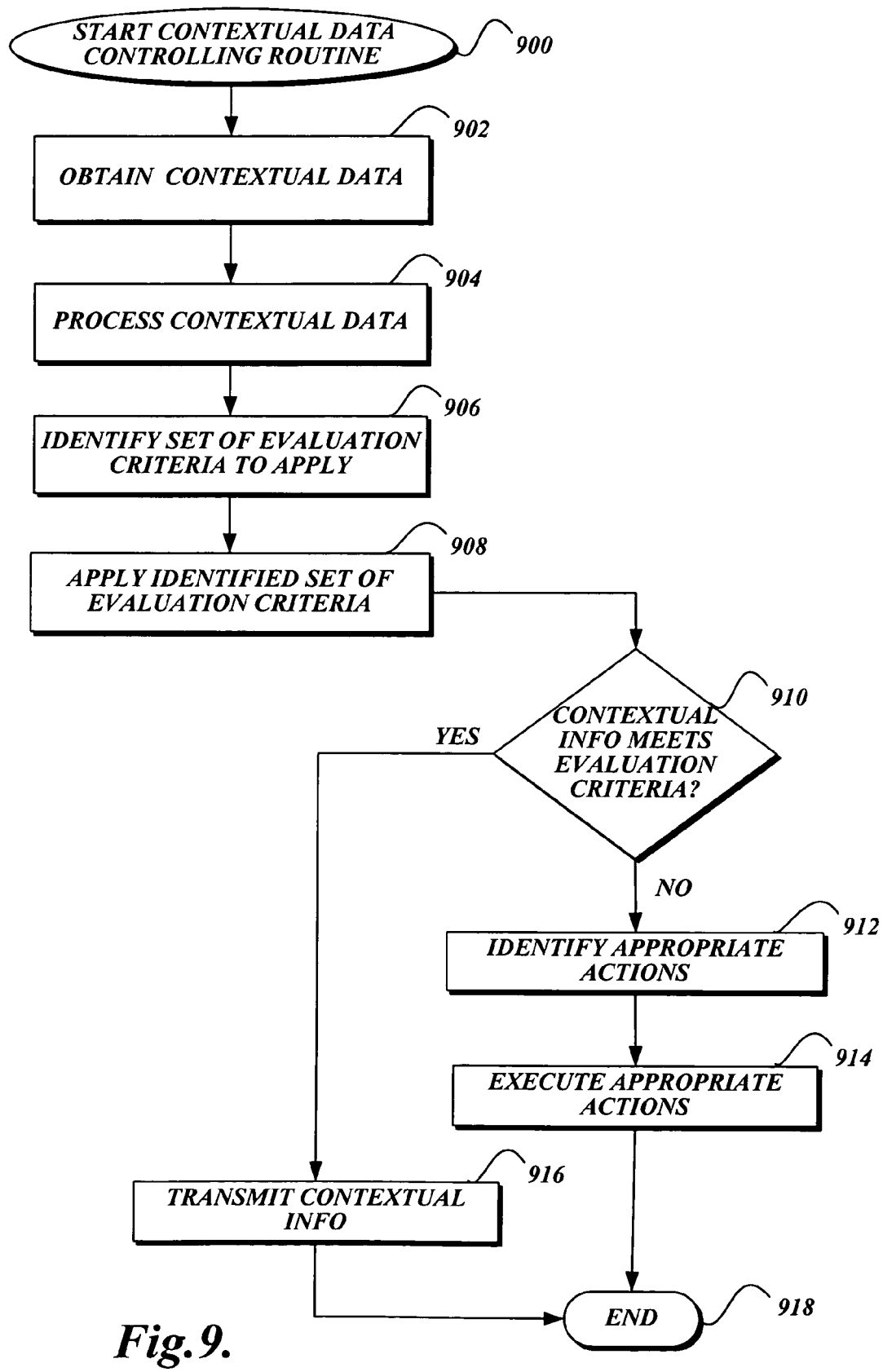
FIG. 9 is a flow diagram illustrating a routine for filtering contextual information in accordance with an aspect of the present invention.

FIG. 9 is a flowchart illustrating a routine 900 for collecting and processing contextual information in accordance with an embodiment of the present invention. In an illustrative embodiment, a device of a sending client (a sending computing device) may have requested its associated service provider to initiate a communication channel connection with a device of a recipient client (a recipient computing device). For the purpose of discussion, assume that the sending computing device (e.g., a device of a calling VoIP client, a called VoIP client, etc.) may reside in an internal network coupled to an edge server. A service provider of the sending client may receive the contextual information from the sending computing device via the edge server, which is configured to control incoming or outgoing contextual information at any time, including before establishing a communication channel (e.g., during a connection set-up phase), during a conversation, or after terminating a communication channel. However, it is contemplated that any authorized VoIP entity in the IP environment 100 can control contents of contextual information by adding, removing, updating, and/or storing part of the contextual information that is transmitted.

Beginning at block 902, the edge server may obtain contextual information from the sending computing device of the sending client. The sending client can be any VoIP entity that is capable of transmitting contextual information as part of a conversation. As described above, based on the content of the contextual information, the information sending client identifies at least one structured hierarchy from predefined structured hierarchies, such as XML namespace and the like. The edge server may further obtain the identified structured hierarchies from the sending client. At block 904, the edge server processes the obtained contextual information based on the identified structured hierarchies. At block 906, a set of evaluation criteria may be identified based on the processed contextual information. The set of evaluation criteria may be determined based on information relating to the sending client and the recipient client. In one embodiment, the private network (internal network) may have a set of rules relating as to which information cannot be disseminated outside of the internal network, which individual user of the sending client has authority to communicate information with a certain level of security, etc. For example, an individual user of the sending client may have a highest security level to read, update, and transmit certain security information in the private network, but the sending client does not have authority to transmit such information to a client outside of the private network. The edge server may determine the origination and the destination of the obtained contextual information and identify a set of evaluation criteria accordingly. As discussed above, each client may have a different set of evaluation criteria based on authority level, security level, and the like.

The edge server further monitors calling behaviors of the sending client within the private network. In one embodiment, the edge server may block an incoming call from a certain caller (e.g., one from the undesirable caller list) or filter an incoming call that contains prohibited information based on the predetermined set of evaluation criteria. In another embodiment, the edge server may control contents of outgoing contextual information from the sending client within the network to the recipient client outside of the network. For example, if the sending computing device transmits contextual information that may be related to classified information that the sending client does not have authority to send outside of the network, the contextual information corresponding to the classified information may be removed from the conversation between the sending client and the recipient client. In this embodiment, all incoming and outgoing contextual information may be funneled into the edge server before the information going out from or coming in to a client within the private network.

In one embodiment, the edge server may request the individual user, who is currently communicating, to provide user biometric information, user authentication information, etc., to determine the proper set of evaluation criteria. In this embodiment, more contextual information will be exchanged between the sending computing device and the edge server. At block 908, a set of evaluation criteria may be applied to the contextual information. The edge server may determine the scope of contextual information based on an origination and/or destination (e.g., VoIP clients, service providers, third party service provider, etc.) of the contextual information. For example, if the recipient client (i.e., destined client) is in a different level of security classification network, no contextual information may be exchanged or only subsets of cleared contextual information may be exchanged.

At decision block 910, a determination is made as to whether the obtained contextual information meets the identified set of evaluation criteria. In one embodiment, the edge server may be able to recognize potential policy breaches or security breaches in the contextual information if the contextual information does not meet the set of evaluation criteria. If it is determined at decision block 910 that the obtained contextual information does not meet the set of evaluation criteria, at block 912, the edge server may identify an appropriate action based on the result of the matching process. An example of an appropriate action may include, but is not limited to, updating the contextual information by removing the undesirable part of contextual information, terminating the communication channel, transmitting a warning message, requesting permission from a higher authority, and the like. In one embodiment, the contextual information may be further updated as a result of execution of the appropriate action. In this embodiment, the edge server may add more contextual information relating to a notification message, dummy information for the deleted part of contextual information, and the like. In another embodiment, the updated contextual information may be transmitted to an appropriate third party client based on predetermined rules of the network. If it is determined at decision block 910 that the contextual information meets the set of evaluation criteria, the contextual information may be transmitted to the recipient client as illustrated at block 916. After transmitting the contextual information (block 916) or executing an appropriate action (block 914), the routine 900 completes at block 918.

It is to be understood that the embodiments explained in conjunction with the routine 900 are provided merely for example purposes. In one embodiment, several edge servers may share the responsibility to control the content of communication information in a distributed manner. It is contemplated that the routine 900 can also be performed by a service provider or a third party service provider that is capable of receiving contextual information and applying the set of evaluation criteria. For example, a service provider on premises may include a module to monitor incoming/outgoing communication information. Upon detection of a potential breach of the internal policy of the network or the organization based on a proper set of evaluation criteria, the service provider may execute an appropriate action, as discussed above.

In an illustrative embodiment, upon detection of undesirable contextual information from the obtained contextual information, the edge server can execute various actions other than the above-discussed ones, for example, blocking or quarantining the entire e-mail message including such contextual information, removing file attachments associated with the contextual information, adding warning labels to the contextual information, etc. It is contemplated that routine 900 can be implemented not only on contextual information, but also on voice and media information.

Figure 10:
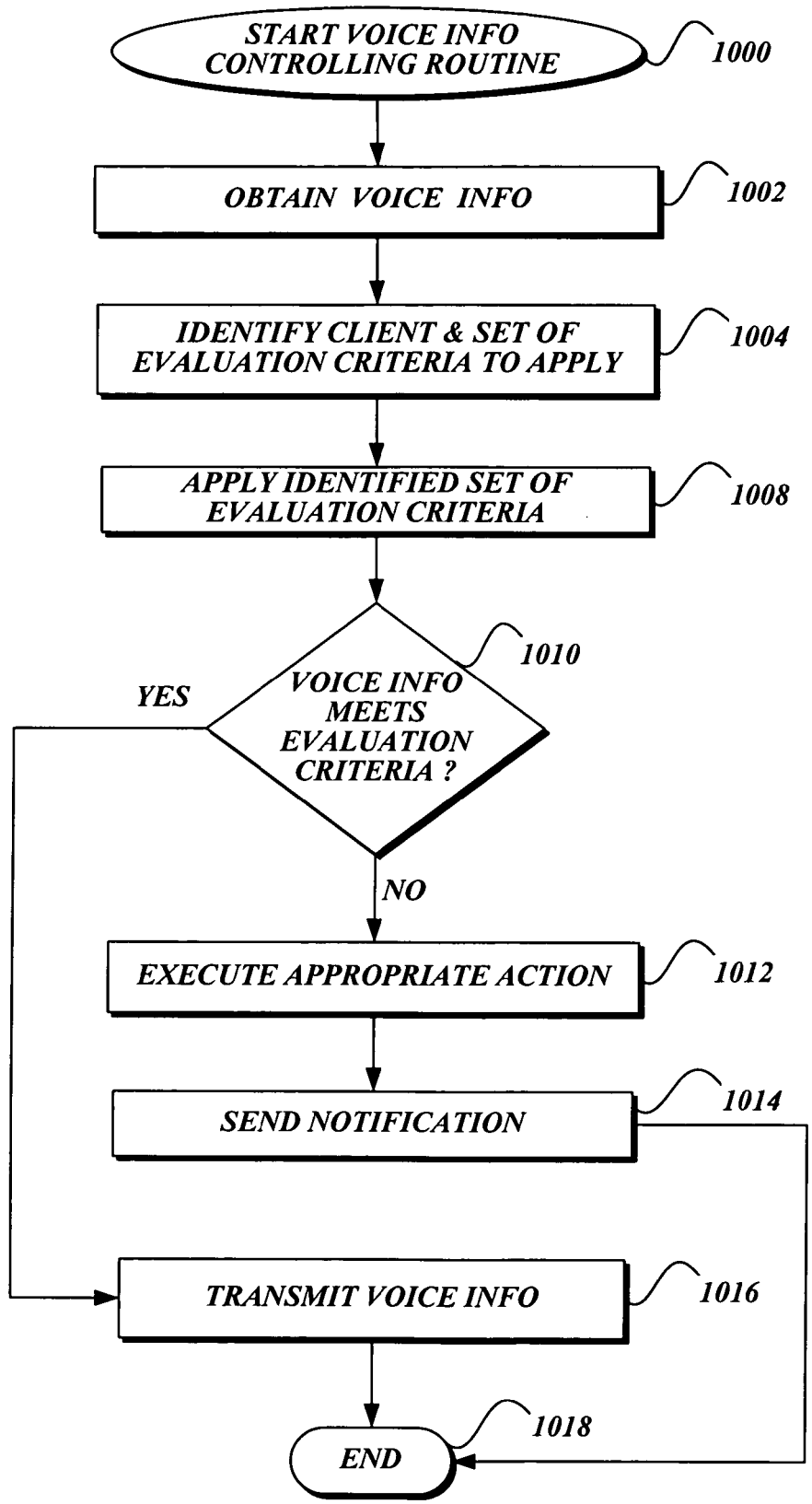
FIG. 10 is a flow diagram illustrating a routine for screening voice information in accordance with an aspect of the present invention.

FIG. 10 is a flowchart illustrating a routine 1000 for collecting and processing voice information in accordance with an embodiment of the present invention. In an illustrative embodiment, a device of a sending client (a sending computing device) may have established a communication channel connection with one of the devices of a recipient client (a recipient computing device). As with FIG. 9, for the purpose of discussion, assume that the sending computing device (e.g., a device of a calling VoIP client, a called VoIP client, etc.) may reside in an internal network coupled to an edge server. A service provider of the sending client may receive the voice information via the edge server, which is configured to control incoming or outgoing voice information at any time during a conversation.

Beginning at block 1002, the edge server may obtain voice information from the sending computing device. At block 1004, the edge server processes the obtained voice information to monitor the contents of the voice information. At block 1006, a set of evaluation criteria may be identified based on the processed voice information. The set of evaluation criteria may be determined based on previously obtained contextual information relating to the sending party and the recipient client. In one embodiment, the private network (internal network) may have a set of rules relating to which information cannot be disseminated outside of the inter network, which user has an authority to communicate information with a certain level of security, etc. For example, the sending client may have authority to discuss certain subject matter with any clients in the private network, but the information sending client does not have authority to discuss such information to a client outside of the private network. In this embodiment, the edge server may not allow further communication between the sending client and the client outside of the private network.

In one embodiment, the edge server may block incoming voice information from a certain caller based on the predetermined set of evaluation criteria. In another embodiment, the edge server may control contents of outgoing voice information. For example, if the sending client within the private network transmits voice information that may be related to classified information, the communication channel may be interrupted. In this embodiment, the edge server may transmit warning voice information to the sending client and advice to terminate the call. Alternatively, the edge server may request the sending client to provide permission from proper authority in order to continue the communication. As described earlier, all incoming and outgoing voice information may be funneled into the edge server before the voice information going out from or coming in to the private network.

In one embodiment, the edge server may request the individual user who is currently communicating to provide biometric information, authentication information, etc., to determine the proper set of evaluation criteria. In this embodiment, the corresponding contextual information will be exchanged between the sending client and the edge server. At block 1008, a set of evaluation criteria may be applied to the voice information. At decision block 1010, a determination is made as to whether the voice information meets a set of evaluation criteria. If it is determined at decision block 1010 that the voice information does not meet a set of evaluation criteria, the edge server selects and executes an appropriate action at block 1012. An example of the appropriate action includes, but is not limited to, terminating the communication channel, interrupting, muting a portion of voice information, warning the sending client of the potential policy breaches, altering the communication channel to a different recipient client, etc. In one embodiment, the edge server may add more contextual information relating to a notification message, dummy information for deleted part of contextual information, and the like. At block 1014, a notification message relating to the appropriate action may be sent to the sending clients. If it is determined at decision block 1010 that the voice information meets a set of evaluation criteria, the voice information may be transmitted to a next destination, as illustrated at block 1016. The routine 1000 completes at block 1018.

It is to be understood that the embodiments explained in conjunction with the routine 1000 are provided merely for example purposes. As with routine 900, it is contemplated that the routine 1000 can also be performed by a service provider or a third party service provider that is capable of intercepting communication information, applying predefined evaluation criteria of an internal (private) network, and filtering/adding communication information. For example, a service provider on premises can identify a set of evaluation criteria for communication information exchanged via its corresponding internal network. In this example, the service provider may include a module to monitor incoming/outgoing communication information. Upon detection of a potential breach of the internal policy (or security) of the network or the organization, the service provider identifies and executes proper actions before transmitting the received information. It is also contemplated that the edge server can control content of the voice information transmitted as part of media information, or the edge server can control content of the media information itself. It is further contemplated that the routine 1000 can be implemented when more than two VoIP clients communicate with each other over multiple communication channels.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for managing a voice over IP conversation between one or more clients on a communication channel, comprising:
    obtaining communication information relating to an existing conversation on a communication channel, wherein the communication information relating to the existing conversation comprises one or more packets of voice communication information and one or more packets of contextual information;
    identifying a set of evaluation criteria based on the one or more clients, the set of evaluation criteria specifying one or more rules used to determine whether the communication information includes undesirable content, wherein transmission of the undesirable content would constitute at least one of a policy breach and a security breach;
    determining whether at least one of the one or more packets of contextual information and the one or more packets of voice communication information includes undesirable content as specified by the evaluation criteria, the undesirable content determined from detecting a keyword within the communication information,
    based on a determination that at least one of the one or more packets of contextual information and at least one of the one or more packets of voice communication information includes undesirable content, altering the at least one of the one or more packets of contextual information and at least one of the one or more packets of voice communication information that includes the undesirable content; and
    based on a determination that the one or more packets of contextual information and the one or more packets of voice communication information do not include undesirable content, transmitting the one or more packets of contextual information and the one or more packets of voice communication information to a recipient client of the one or more clients.

2. The method as recited in claim 1, wherein obtaining communication information relating to an existing conversation includes obtaining communication information from a sending computing device within an internal network and addressed to at least one recipient computing device outside of the internal network.

3. The method as recited in claim 1, wherein obtaining communication information relating to an existing conversation includes obtaining communication information from a sending computing device outside of an internal network and addressed to at least one recipient computing device within the internal network.

4. The method as recited in claim 1, wherein the contextual information corresponds to data having a value and wherein determining whether at least one of the one or more packets of contextual information and the one or more packets of voice communication information includes undesirable content as specified by the evaluation criteria comprises determining whether the contextual information matches a predetermined value or set of values.

5. The method as recited in claim 1, wherein based on a determination that at least one of the one or more packets of contextual information and at least one of the one or more packets of voice communication information includes undesirable content further comprises preventing a transmission of the at least one or more packets of voice communication.

6. The method as recited in claim 1, wherein based on a determination that at least one of the one or more packets of contextual information and at least one of the one or more packets of voice communication information includes undesirable content, altering the at least one of the one or more packets of contextual information and at least one of the one or more packets of voice communication information that includes the undesirable content further comprises forwarding the one or more packets of voice communication to a recipient computing device.

7. The method as recited in claim 1, wherein altering the at least one of the one or more packets of contextual information and at least one of the one or more packets of voice communication information includes transmitting a message to a sending computing device, the message including additional information from the processing of the communication information according to the set of evaluation criteria.

8. The method as recited in claim 1, wherein transmitting the message to a sending computing device includes transmitting the message to the sending computing device via the communication channel.

9. The method as recited in claim 1, wherein altering the at least one of the one or more packets of contextual information and at least one of the one or more packets of voice communication information includes transmitting one or more additional packets of contextual information in the communication channel that indicates results from the processing of the communication information according to a set of evaluation criteria.

10. The method as recited in claim 1, wherein the communication channel is a Voice over Internet Protocol communication channel.

11. A system for managing a voice over IP conversation between one or more clients on a communication channel comprising:
 a first and a second computing device that exchange communication information via conversation established over an established communication channel, wherein the communication information relating to a conversation comprises one or more packets of voice communication information and one or more packets of contextual information related to the conversation;
 a processing computing device that:
  identifies a set of evaluation criteria based on the one or more clients, the set of evaluation criteria specifying one or more rules used to determine whether the communication information includes undesirable content, wherein transmission of undesirable content would constitute at least one of a policy breach and a security breach; and
  monitors the one or more packets of voice communication information and the one or more packets of contextual information for a keyword indicating the undesirable content;
  wherein based on a determination that at least one of the one or more packets of contextual information and at least one of the one or more packets of voice communication information includes undesirable content, the processing computing device alters the at least one of the one or more packets of contextual information and at least one of the one or more packets of voice communication information that includes the undesirable content; and
  wherein based on a determination that the one or more packets of contextual information and the one or more packets of voice communication information do not include undesirable content, the processing computing device transmits the one or more packets of contextual information and the one or more packets of voice communication information to a recipient client of the one or more clients.

12. The system as recited in claim 11, wherein the first computing device and the processing computing device communicate via an internal communication network and wherein the second computing device communicates via an external communication network.

13. The system as recited in claim 11, wherein the first and second computing devices and the processing computing device communicate via an external communication network.

14. The system as recited in claim 11, wherein based on a determination that at least one of the one or more packets of contextual information and at least one of the one or more packets of voice communication information includes undesirable content, the processing device prevents a transmission of the at least one or more packets of voice communication from the first computing device to the second computing device.

15. The system as recited in claim 11, wherein based on a determination that at least one of the one or more packets of contextual information and at least one of the one or more packets of voice communication information includes undesirable content, the processing device forwards the one or more packets of voice communication to a third computing device.

16. The system as recited in claim 11, wherein based on a determination that at least one of the one or more packets of contextual information and at least one of the one or more packets of voice communication information includes undesirable content, the processing device transmits a message to the first computing device indicating a result of the determination.

17. A computer readable storage device having computer executable instructions stored thereon which, when executed by a computing system, manage a voice over IP conversation between one or more clients on a communication channel, the instructions comprising:
 communication instructions for obtaining communication information via an established communication channel between a first and a second computing device, wherein the communication information relating to a conversation comprises one or more packets of contextual information related to the conversation;
 information processing instructions for processing the information exchanged between the first and second computing devices via the communication channel according to a set of evaluation criteria that specify one or more rules used to determine whether the communication information includes undesirable content, wherein transmission of the undesirable content would constitute at least one of a policy breach and a security breach, and monitoring the one or more packets of contextual information for a keyword indicating the undesirable content;

wherein based on a determination that at least one of the one or more packets of contextual information includes undesirable content, the processing instructions alter the at least one of the one or more packets of contextual information that includes the undesirable content, wherein altering the at least one of the one or more packets of contextual information includes one of deleting the undesirable content and adding information to the one or more packets of contextual information; and wherein based on a determination that the one or more packets of contextual information does not include undesirable content, communication instructions transmit the at least one of the one or more packets of contextual information to a recipient client of the one or more clients.

18. The computer readable storage device of claim 17, wherein the information processing instructions associate one or more values to the information exchanged between the first and second computing device and wherein processing the information according to a set of evaluation criteria includes determining whether the determined value for the information matches a predetermined value.

19. The computer readable storage device of claim 17, wherein the first computing device corresponds to a first communication network and the second computing device corresponds to a second communication network, and wherein the communication instructions for obtaining communication information intercept data packets between the first and the second computing devices.

20. The computer readable storage device of claim 17, wherein based on a determination that at least one of the one or more packets of contextual information includes undesirable content, the processing instructions filter one or more packets of contextual information.

* * * * *